United States Patent [19]

Jones

[11] Patent Number: 5,074,332
[45] Date of Patent: Dec. 24, 1991

[54] HOSE COUPLING UNIT FOR REFRIGERANT SYSTEM

[75] Inventor: James M. Jones, Dayton, Ohio

[73] Assignee: Production Control Units, Inc., Dayton, Ohio

[21] Appl. No.: 568,246

[22] Filed: Aug. 16, 1990

[51] Int. Cl.$^5$ ............................................. F16L 29/00
[52] U.S. Cl. .................... 137/614.06; 251/149.9
[58] Field of Search ................... 251/89.5, 149.9; 137/614.06, 637.5, 614, 614.04

[56] References Cited

U.S. PATENT DOCUMENTS

| | | | |
|---|---|---|---|
| 2,887,124 | 5/1959 | Mell | 137/614.06 |
| 2,901,008 | 8/1959 | Cavett et al. | 137/614 X |
| 3,295,553 | 1/1967 | Garrett et al. | 137/614.06 |
| 3,301,272 | 1/1967 | Pettyjohn et al. | 137/614.06 |
| 3,348,575 | 10/1907 | Simak | 137/614 X |
| 3,407,847 | 10/1968 | Snyder | 137/614.06 |
| 4,676,269 | 6/1987 | Sarson | 137/614.06 |

Primary Examiner—John C. Fox
Attorney, Agent, or Firm—Jacox & Meckstroth

[57] ABSTRACT

One end section of a three section tubular coupling body is connected to a flexible hose, and the opposite end section supports a manually actuated coupler for releasably locking the body to a valve fitting of an air conditioning or refrigeration system. A valve member is supported within the body for axial movement between an extended open position and a retracted closed position. In its extended position, the valve member opens a valve stem within the fitting and opens a flow valve within the body. In its retracted position, the valve member closes the fitting valve and the flow valve. A manually actuated lever is connected by rotary cam members to move the valve member and is effective to block disconnection of the coupler when the valve member is in its extended open position and to lock the valve member in its retracted closed position.

19 Claims, 1 Drawing Sheet

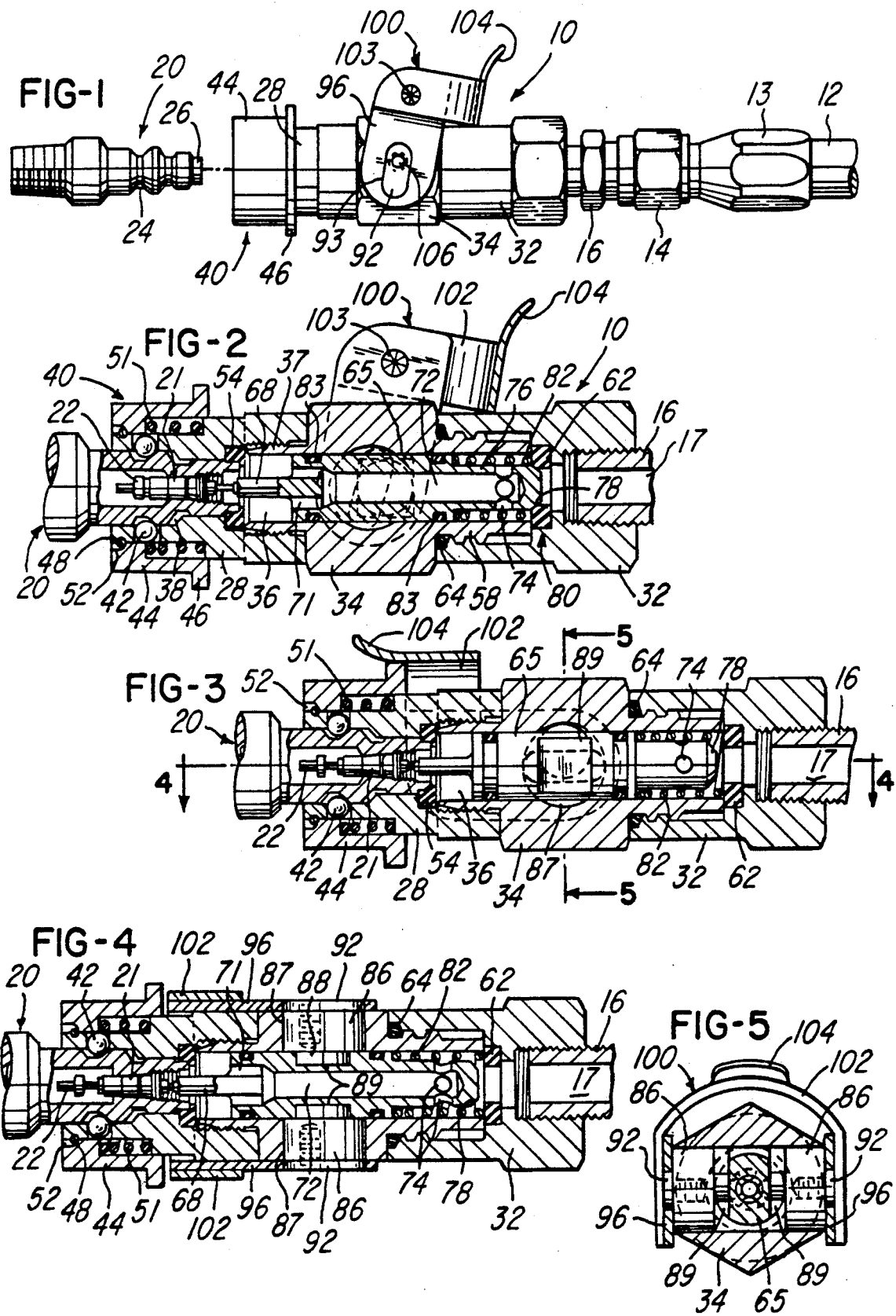

HOSE COUPLING UNIT FOR REFRIGERANT SYSTEM

BACKGROUND OF THE INVENTION

In the art of charging a refrigeration or air conditioning system, it is common for the system to have a process fitting which encloses a valve. Preferably, the fitting is adapted to receive a quick connect and disconnect coupling such as disclosed, for example, in U.S. Pat. No. 4,889,149 which issued to the Assignee of the present invention. This patent discloses an automatic air actuated dispensing tool assembly which grips or locks onto the process fitting, evacuates the refrigeration or air conditioning system and then charges the system with a predetermined volume of refrigerant. The valves are then automatically closed, and the assembly is automatically released from the process fitting. This dispensing tool assembly is ideally suited for use in automotive or motor vehicle assembly plants or in refrigeration and air conditioning assembly plants.

In plants which are less automated or in the after market, it is common to use a manually operated quick connect and disconnect coupling for attaching a flexible hose to the process fitting on the system, after which the system is evacuated and/or charged with refrigerant supplied through the hose. According to one type of quick connect and disconnect coupling, a manually retractable spring biased sleeve or collar surrounds a set of balls confined within corresponding holes, and the balls are adapted to project into a reduced neck portion of the process fitting to lock the coupler onto the fitting.

The coupler may also enclose a valve opening member which opens the fitting valve when the coupling is inserted axially onto the fitting. When the coupler is manually disconnected from the fitting, a small amount of the gas refrigerant normally escapes into the atmosphere either from the fitting and/or from the supply hose. Since the gas refrigerant may pollute the atmosphere, it is desirable to eliminate or minimize the volume of refrigerant that escapes during the connecting and disconnecting operations, as stated in above-mentioned U.S. Pat. No. 4,889,149.

SUMMARY OF THE INVENTION

The present invention is directed to an improved coupling unit for manually connecting a flexible hose to a process fitting on a refrigeration or air conditioning system and which is ideally suited for evacuating the system and/or charging the system with refrigerant. The coupling unit of the invention incorporates a quick connect and disconnect coupler for locking the unit to the process fitting and assures that the valve within the process fitting remains in its closed position until after the coupling unit is connected to the fitting. The coupling unit also prevents disconnecting the coupling from the fitting until after the fitting valve is closed. This assures that no refrigerant will escape through the process fitting during connecting and disconnecting the coupling unit. In addition, the coupling unit of the invention provides for positively closing the flow passage within the coupling unit before being disconnected from the process fitting to assure that no refrigerant escapes from the supply hose or that the suction is stopped.

In accordance with a preferred embodiment of the invention, the above features are provided by a three section tubular coupling body wherein a forward section supports a manually actuated coupler for positively connecting the body to the process fitting. A rearward body section is coupled to a flexible hose and supports a resilient annular valve seat member, and a center section of the body supports an axially movable valve member. The valve member has a forward pin portion for opening the valve within the process fitting and a rearward portion for engaging the resilient valve seat member. The valve member is shifted axially within the coupling body by rotation or pivoting of a manually actuated lever which is connected to the valve member by eccentric cam members. In one position, the valve member opens the fitting valve and the actuating lever blocks operation of the coupler, and in another position of the actuating lever, the valve member is locked against the seat member to close the evacuation and/or refrigerant flow passage.

Other features and advantages of the invention will be apparent from the following description, the accompanying drawing and the appended claims.

BRIEF DESCRIPTION OF THE DRAWING

FIG. 1 is a side elevational view of a coupling unit constructed in accordance with the invention and showing its use for connecting a flexible hose to a process fitting;

FIG. 2 is an enlarged axial section of the coupling unit of FIG. 1 and showing the unit connected to the process fitting;

FIG. 3 is a section similar to FIG. 2 and showing the coupling unit in a position where the valves are opened;

FIG. 4 is an axial section taken generally on the line 4—4 of FIG. 3; and

FIG. 5 is a radial section of the unit taken generally on the line 5—5 of FIG. 3.

DESCRIPTION OF THE PREFERRED EMBODIMENT

FIG. 1 illustrates a coupling unit 10 which is connected to a flexible hose 12 by a set of conventional fittings 13, 14 and 16 which define a flow passage 17 and provide for rotating the coupling unit 10 relative to the hose. The opposite end of the flexible hose 12 is connected to a suction pump (not shown) or to a refrigeration charging system (not shown). The coupling unit 10 is adapted to receive a process fitting 20 which projects from an air conditioning or refrigeration system (not shown) and encloses a Schrader-type valve 21 having a spring biased and normally closed valve stem 22. The fitting 20 has an annular groove defined by a neck portion 24, and a stepped cylindrical tip portion 26 surrounds the Schrader valve 21.

As shown in FIG. 2, the coupling unit 10 includes three tubular sections, a forward section 28, a rearward section 32 and a center section 34 which defines a cylindrical passage or chamber 36. The forward section 28 is threadably connected to a tubular projection 37 of the center section 34 and defines a stepped bore 38 for receiving the fitting 20 in close-fitting relation. The forward body section 28 supports a snap-on coupler 40 which includes a set of peripherally spaced holes for receiving corresponding balls 42. An annular sleeve or collar 44 is supported for axial movement by the body section 28 and normally retains the balls 42 in positions projecting into the bore 38 for engaging the neck portion 24 of the process fitting 20 to lock the body section 28 onto the fitting 20. The collar 44 has an outwardly projecting flange 46 and is normally urged axially against a retaining ring 48 by a compression spring 51 confined between the body section 28 and the collar 44. The ring 48 is normally received within an annular recess 52 formed within the forward end of the collar 44.

The coupler 40 operates in a conventional manner. That is, when it is desired to connect or disconnect the coupling unit 10 to the process fitting 20, the collar 44 is retracted to the right (FIG. 2) to compress the spring 51 and release the balls 42 for radial outward movement into the recess 52 for disengaging or releasing the fitting 20. The forward body section 28 confines a resilient sealing washer 54 which is retained by the tubular portion 37 of the center body section 34 and is effective to form a fluid-tight seal between the outer end portion of the process fitting 20 and the coupling unit 10. The center section 34 of the coupling unit 10 also has a rearwardly projecting tubular portion 58 which is threadably connected to the rearward section 32 and retains a resilient annular valve seat 62. A resilient O-ring 64 forms a fluid-tight seal between the body sections 32 and 34.

As mentioned above, the center section 34 of the coupling unit 10 has an internal cylindrical bore or chamber 36 which slidably supports an elongated valve member 65. A valve stem opening member or pin 68 is formed as an integral part of the valve member 65 and projects forwardly or axially for engagement with the valve stem 22 within the Schrader valve 21. The base portion of the opening member 68 is surrounded by peripherally spaced holes 71 which connect with an axially extending passage 72 within the valve member 65. A set of four circumferentially spaced radial ports or holes 74 are formed within a reduced cylindrical rearward end portion 76 of the valve member 65 and connect with the chamber 36 adjacent to a tapered or frusto-conical end surface 78 positioned to engage the resilient valve seat 62 to form a flow control valve 80. A compression spring 82 surrounds the rearward end portion 76 of the valve member 65 and normally urges the valve member 65 forwardly to an open position where both the Schrader valve 21 and the flow valve 80 are open. A pair of resilient O-rings 83 form fluid-tight sliding seals between the axially movable valve member 65 and the center section 34 of the coupling unit 10.

Referring to FIG. 4, a pair of cylindrical actuating cam members 86 are supported for rotation within corresponding aligned bores 87 formed within the center body section 34, and each member 86 has an eccentrically located cylindrical cam portion 88 which projects inwardly into a corresponding square recess 89 (FIG. 3) formed within the side of the valve member 65. An elongated boss 92 (FIGS. 1 and 4) is formed as an integral part of each cam member 86 and projects outwardly into a mating slot 93 formed within a corresponding side plate 96 of an actuating member or lever 100. The lever 100 includes a U-shaped bracket 102 which is rigidly connected to the side plates 96 by spot welds 103, and the bracket 102 includes a projecting lip or gripping portion 104. The actuating lever 100 is attached to the cam members 86 by springing apart the side plates 96 and then pressing the side plates over the bosses 92 until the bosses 92 snap into the mating slots 93. A threaded hole 106 is formed within each cam member 86 to provide for receiving a screw (not shown) to pull each cam member 86 from its corresponding bore 87 after the actuating lever 100 is removed.

When it is desired to use the coupling unit 10 for connecting the flexible hose 12 to the process fitting 20 projecting from an air conditioning or refrigeration system for the purpose of either evacuating and/or charging the system, the sleeve or collar 44 is manually gripped and retracted against the bias of the spring 51, and the forward body section 28 is inserted onto the fitting 20 while the balls 42 are received within the cavity 52. The collar 44 is then released to cam the balls 42 inwardly into the neck portion 24 of the fitting 20 so that the coupling unit 10 is locked or secured to the fitting with the resilient washer 54 forming a fluid-tight seal between the fitting and the coupling unit.

The actuating lever 100 is then pivoted from its released position (FIGS. 1 and 2) to its actuated or locked position (FIGS. 3-5) where the bracket 102 and the side plates 96 of the actuating lever 100 are positioned to block retraction of the collar 44 and thereby provide an interlock which prevents release or disconnection of the unit 10 from the fitting 20. When the actuating lever 100 is rotated or pivoted counterclockwise, the lever also rotates the cam members 86 causing the eccentric portions 88 to shift the valve member 65 from its closed position (FIG. 2) to its open position (FIGS. 3 and 4). In its open position, the valve member 65 opens the valve stem 22 of the Schrader valve 21 and also opens the flow control valve 80 within the rearward portion of the coupling unit 10 so that the flow passage 17 within the fitting 16 is connected by the holes or ports 74 and the passages 71 and 72 to the chamber 36 and passage within the process fitting 18.

When the valves 21 and 80 are opened, the air conditioning or refrigeration system may be evacuated through the hose 12 and then, if desired, charged with a predetermined volume of refrigerant. After the evacuation and/or charging operations, the actuating lever 100 is rotated or pivoted clockwise to its closed position (FIGS. 1 and 2) where the valve member 65 seats on the valve seat 62 to close the valve 80 and to permit the valve stem 22 to return to its normally closed position, as shown in FIG. 2. As the cam members 86 rotate with the actuating lever 100, the axis of the cylindrical cam portions 88 pass slightly over center of the axis of the cam members 86 (FIG. 2) so that the valve member 65 is locked against the resilient valve seat 62. As a result, the valve member 65 can withstand substantial fluid pressure within the hose 12 without unseating from the valve seat 62.

From the drawing in the above description, it is apparent that a coupling unit constructed in accordance with the present invention, provides desirable features and advantages. From example, the coupling unit 10 is positively connected or coupled to the process fitting 20 and is prevented from being disconnected or decoupled so long as the Schrader valve 21 and flow valve 80 are open. In order to release the coupler 40 from the fitting 20, it is necessary to pivot the actuating lever 100 to its closed position for retracting the valve member 65 so that both the Schrader valve 21 and the flow valve 80 are closed. After these valves are closed, the coupler unit 10 may be disconnected or released from the process fitting 18 by retracting the collar 44, and no fluid or gas escapes from the process fitting 20 or from the hose 12. The over center action of the cam portions 86 also assures that the flow valve 80 is positively closed so that a substantial fluid pressure may be held within the flexible hose 12.

While the form of coupling unit herein described constitutes a preferred embodiment of the invention, it is to be understood that the invention is not limited to this precise form, and that changes may be made therein without departing from the scope and spirit of the invention as defined in the appended claims.

The invention having thus been described, the following is claimed:

1. A coupling unit adapted for connecting a flexible evacuation hose and/or refrigerant supply hose to an air conditioning or refrigeration system having a valve fitting enclosing a normally closed movable valve stem, said coupling unit comprising a body defining a chamber and having an axis, manually actuated coupler means for releasably connecting said body to the valve fitting, a valve member supported within said chamber for axial movement, said valve member being movable between a retracted position and an extended position where said valve member is effective to open the valve stem within the valve fitting when said body is connected to the fitting, a manual actuating lever supported by said body for movement between a released position and a locked position, means connecting said actuating lever to said valve member and effective to move said valve member between said retracted and extended positions in response to movement of said actuating lever between said released and locked positions, said actuating lever including spaced side portions receiving said body therebetween, a pair of opposing cam members rotatably supported by said body and having corresponding eccentric cam portions engaging said valve member, and interlock means for blocking operation of said coupler means when said actuating lever is in said locked position to avoid disconnecting said coupling unit from the valve fitting when said valve member is in said extended position and the valve stem is open.

2. A coupling unit as defined in claim 1 and including means forming a valve seat within said body, and said valve member includes means for engaging said valve seat when said valve member is in said retracted position to prevent flow through said chamber.

3. A coupling unit as defined in claim 2 and including means for positively securing said valve member in said retracted position to provide for holding substantial fluid pressure within the hose.

4. A coupling unit as defined in claim 1 wherein said body comprises a forward section and a rearward section each threadably connected to a center section defining said chamber, said coupler means comprise a set of retractable balls supported within corresponding holes within said forward section, and a spring biased retainer sleeve supported for axial movement by said forward section and engaging said balls.

5. A coupling unit as defined in claim 1 wherein said valve member defines an axially extending fluid passage connected to said chamber by at least one radially extending port adjacent a rearward end portion of said valve member, and an annular valve seat supported by said body for engaging said rearward end portion of said valve member when said valve member is in said retracted position.

6. A coupling unit as defined in claim 1 wherein said body confines a resilient annular seal disposed for engaging an outer end portion of the fitting, and said valve member includes a pin portion disposed for projecting through said seal to engage the valve stem within the fitting.

7. A coupling unit adapted for connecting a flexible evacuation hose and/or refrigerant supply hose to an air conditioning or refrigeration system having a valve fitting enclosing a normally closed movable valve stem, said coupling unit comprising a tubular body defining a chamber having an axis, manually actuated coupler means for releasably connecting said body to the valve fitting, means forming an annular valve seat within said body at one end of said chamber, a valve member supported within said chamber for axial movement, said valve member being movable between a retracted position and an extended position, said valve member having a projecting pin portion effective to open the valve stem within the valve fitting when said body is connected to the fitting and said valve member is in said extended position, a manual actuating member supported by said body for movement between a released position and a locked position, means connecting said actuating member to said valve member and effective to move said valve member between said retracted and extended positions in response to movement of said actuating member between said released and locked positions, said valve member defining an axially extending fluid passage connected to said chamber by a plurality of radially extending ports located adjacent a rearward end portion of said valve member, said valve seat including a resilient washer-like member supported by said body, said rearward end portion of said valve member engaging said resilient member when said valve member is in said retracted position and said actuating member is in said released position to prevent flow through said chamber, and interlock means for blocking operation of said coupler means when said actuating member is in said locked position to avoid disconnecting said coupling unit from the valve fitting when said valve member is in said extended position and the valve stem is open.

8. A coupling unit as defined in claim 7 wherein said actuating member comprises a lever, and said connecting means comprise at least one rotary cam member coupled to said lever and having an eccentric portion engaging said valve member.

9. A coupling unit as defined in claim 7 wherein said connecting means and said actuating member move through an over center position for positively securing said valve member in said retracted position against said valve seat to provide for holding substantial fluid pressure within the hose.

10. A coupling unit as defined in claim 7 wherein said body comprises a forward section and a rearward section each threadably connected to a center section defining said chamber, said coupler means comprise a set of retractable balls supported within corresponding holes within said forward section, and a spring biased retainer sleeve supported for axial movement by said forward section and engaging said balls.

11. A coupling unit adapted for connecting a flexible evacuation hose and/or refrigerant supply hose to an air conditioning or refrigeration system having a valve fitting enclosing a normally closed movable valve stem, said coupling unit comprising a tubular body having a forward end portion and a rearward end portion and defining a chamber having an axis, manually actuated coupler means on said forward end portion of said body for releasably connecting said body to the valve fitting, said rearward end portion of said tubular body defining an axially extending passage for receiving a fluid line, means forming an annular valve seat within said rearward end portion of said body around said passage, an elongated tubular valve member supported within said chamber for axial movement, said valve member being movable axially between a retracted position and an extended position, said valve member having a forwardly projecting pin portion effective to open the valve stem within the valve fitting when said body is connected to the fitting and said valve member is in said extended position, a manual actuating member supported by said body for movement between a released position and a locked position, means extending through said body and connecting said actuating member to said tubular valve member and effective to move said valve member axially between said retracted and extended positions in response to movement of said actuating member between said released and locked positions, said tubular valve member defining an axially extending fluid passage and having a rearward end portion with port means connecting said passage to said chamber, and said rearward end portion of said valve member engages said valve seat when said valve member is in said retracted position and said actuating member is in said released position to prevent flow through said passages and said chamber.

12. A coupling unit as defined in claim 11 wherein said actuating member comprises a lever, and said connecting means comprise at least one rotary cam member coupled to said lever and having an eccentric portion engaging said valve member.

13. A coupling unit as defined in claim 12 wherein said lever includes spaced side portions receiving said body therebetween, and a pair of opposing said cam members rotatably supported by said body and having corresponding said eccentric portions engaging said valve member.

14. A coupling unit adapted for connecting a flexible evacuation hose and/or refrigerant supply hose to an air conditioning or refrigeration system having a valve fitting enclosing a normally closed movable valve stem, said coupling unit comprising a tubular body defining a chamber having an axis, manually actuated coupler means for releasably connecting said body to the valve fitting, a valve member supported within said chamber for axial movement, said valve member being movable between a retracted position and an extended position, said valve member having a projecting portion effective to open the valve stem within the valve fitting when said body is connected to the fitting and said valve member is in said extended position, a manual actuating lever having spaced side walls receiving said body therebetween and movable between a released position and a locked position, a pair of cam members supported for rotation by said body and connected to said side walls of said actuating lever, said cam members having eccentric portions engaging said valve member, and said cam members being effective to move said valve member between said retracted and extended positions in response to rotation of said cam members and movement of said actuating lever between said released and locked positions.

15. A coupling unit as defined in claim 14 wherein said actuating lever is effective to block said coupler means when said actuating lever is in said locked position to avoid disconnecting said coupling unit from the valve fitting when said valve member is in said extended position and the valve stem is open.

16. A coupling unit as defined in claim 14 and including means forming a valve seat within said body, and said valve member having a rearward end portion engaging said valve seat when said valve member is in said retracted position and said actuating lever is in said released position to prevent flow through said chamber.

17. A coupling unit as defined in claim 14 wherein said eccentric portions of said cam members move through an over center position for positively securing said valve member in said retracted position to provide for holding substantial fluid pressure within the hose.

18. A coupling unit as defined in claim 14 wherein said body comprises a forward section and a rearward section each threadably connected to a center section, and said center section defines said chamber.

19. A coupling unit as defined in claim 14 wherein said valve member defines an axially extending fluid passage connected to said chamber by at least one radially extending port located adjacent a rearward end portion of said valve member, and a resilient annular valve seat supported by said body for engaging said rearward end portion of said valve member when said valve member is in said retracted position.

* * * * *